March 18, 1969  J. L. BRICKNER  3,434,047
MAGNETIC FIELD SENSING AND MEASURING APPARATUS
Filed July 25, 1966  Sheet 1 of 2
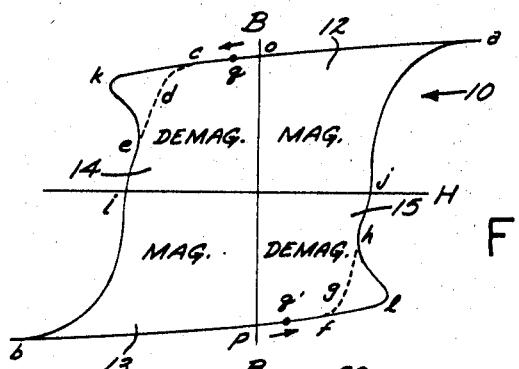
INVENTOR.
JOSEPH L. BRICKNER
BY
ATTORNEYS

INVENTOR.
JOSEPH L. BRICKNER
BY
ATTORNEYS

United States Patent Office 3,434,047
Patented Mar. 18, 1969

3,434,047
MAGNETIC FIELD SENSING AND MEASURING APPARATUS
Joseph L. Brickner, Orange, Calif., assignor to Precision Winding Company, Inc., Santa Ana, Calif., a corporation of California
Filed July 25, 1966, Ser. No. 567,553
U.S. Cl. 324—43         11 Claims
Int. Cl. G01r 33/02, 33/12

ABSTRACT OF THE DISCLOSURE

Apparatus for sensing and measuring magnetic fields having a core made of magnetic material and hysteresis loop of which has lobes in its demagnetizing sectors at least when in the presence of steady ambient magnetic fields.

Background of the invention

This invention relates to apparatus and methods for sensing and measuring magnetic fields.

More particularly, this invention relates to improved cores for magnetic field sensing and measuring apparatus (e.g., magnetometers, vehicle counting and presence detecting apparatus, direction finders, and compasses), to methods of making such improved cores and apparatus, and to methods of operating said apparatus.

Prior art magnetic field sensing and measuring apparatus have utilized the magnetizing quadrant dissymmetry produced by field biasing of conventional hyposquare magnetic cores (i.e., cores which do not exhibit the hypersquare hysteresis loop phenomena described herein in connection with FIGS. 1 and 2). As is well known in the art, however, the achievement of high sensitivity in such apparatus requires that the magnetic material of the core be annealed after the windings have been wound thereon.

This post-winding annealing process makes the prior art magnetic field sensing and measuring apparatus expensive; prohibitively so in certain practical applications in which installation conditions frequently require high sensitivity.

Moreover, a perhaps even greater disadvantage of these prior art apparatus lies in their instability, i.e., the tendency of their cores to lose magnetizing quadrant dissymmetry, and thus to lose magnetic field sensitivity, in response to commonly occurring mechanical shocks, such as those attending the handling and installation of these apparatus, and those resulting from exposure to the stray fields of power transformers.

Summary of the invention

As may be seen from the above, a need exists in many practical fields of application for magnetic field sensing and measuring apparatus which are both cheaper and more stable in sensitivity than the available devices of the prior art.

It is therefore an object of this invention to provide a magnetic field sensitive element which is in some ways similar to the magnetic field sensitive elements of the prior art and yet costs only a fraction of the cost of such prior art elements.

Another object of the present invention is to provide a magnetic field sensitive element which is easier to fabricate than the flux-gate elements of the prior art.

Another object of the present invention is to provide a magnetic field sensitive element the fabrication of which, unlike the flux-gate devices of the prior art, does not require annealing of the core of the device after the core has been fabricated.

Another object of the present invention is to provide a magnetic field sensitive element in which the bobbin or other means supporting the magnetic material of the core need not be composed of refractory materials.

Another object is to provide a magnetic field sensitive element which is less sensitive to mechanical shock and vibration than the magnetic field sensitive elements of the prior art.

Another object of the present invention is to provide a magnetic field sensitive element in which the core material may be employed in the economical form of wire, rather than in the costly form of ultrathin ribbon.

Another object of the present invention is to provide a magnetic field sensitive element which is inexpensive to manufacture and yet may be operated at power line frequencies.

These and other objects and advantages of the invention will be more fully set forth in the following specification and claims, considered in connection with the attached drawings to which they relate.

Description of the drawings

In the drawings:
FIGURES 1 and 2 illustrate the type of hysteresis loop called "hypersquare" herein;
FIGURE 3 is a fragmentary cross-sectional view of a typical core of the kind used in the flux-gate elements of the prior art;
FIGURE 4 is a fragmentary cross-sectional view of a coil structure according to one aspect of the present invention;
FIGURE 5 is a schematic diagram of a circuit including a magnetic flux sensitive element according to the present invention, by means of which magnetic fields may be measured or variations of magnetic fields sensed, e.g., for detecting the presence of vehicles.

Description of the preferred embodiments

Figure 6:
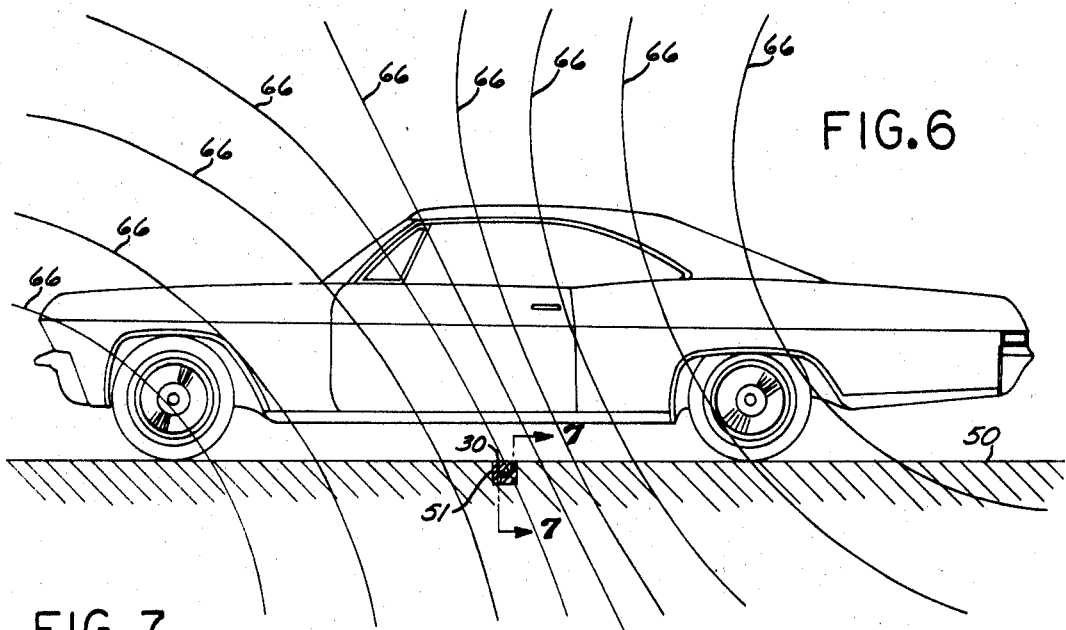
FIGURE 6 illustrates the manner in which the magnetic field sensitive element of the invention may be employed to detect the presence of a vehicle.

Referring to FIGURE 1, the closed loop *akbla* is representative of a hysteresis loop of the type called (namely, defined as) "hypersquare" herein. More particularly, loop *akbla* is representative of the type of hysteresis loop which is said (defined) herein to be "extrinsically hypersquare." The term "hypersquare" without a modifier is generic to both the extrinsically hypersquare loop *akbla* and a type of hysteresis loop represented by the closed loop *adbga* (FIGURE 1) which is called (defined as) "intrinsically hypersquare" herein.

The hypersquare hysteresis loops shown in FIGURE 1 are designated "normal" herein because they were derived by placing the coils to which they correspond in a space free of magnetic field, or orienting said coils so as null the ambient magnetic field (e.g., the earth's magnetic field). Normal hysteresis loops may generally be recognized by the fact that after rotating the portion thereof lying to one side of the B-axis about the H-axis by 180° (e.g., such that *a* and *l* are transposed), the resulting figure is substantially symmetrical about the B-axis.

The hysteresis loops of FIGURE 2 differ from the corresponding normal hysteresis loops of FIGURE 1 in that the ambient magnetic field was not nulled or otherwise eliminated in deriving the loops of FIGURE 2. Thus, they cannot be made symmetrical about the B-axis by rotating the portion on one side of the B-axis about the H-axis. Since the dissymmetrical hysteresis loops of the type illustrated in FIGURE 2 result from the presence of a constant magnetic field within the core of the coil to which they correspond, such hysteresis loops are said to be "field-biased" herein to distinguish them from normal hysteresis loops such as are shown in FIGURE 1. In terms of this nomenclature, loop $a'k'b'na'$ of FIGURE 2 is a field-biased version of the normal loop $akbla$ of FIGURE 1. Similarly, loop $a'd'b'na'$ of FIGURE 2 is a field-biased version of the normal loop $adbga$ of FIGURE 1. There will, of course, be a family of field-biased loops like those of FIGURE 2 corresponding to each normal loop like those of FIGURE 1.

It is pointed out that the loops shown in FIGURE 2 are also "hypersquare," as the term is employed herein.

The further convention is adopted herein of designating the quadrants defined by the coordinate axes of a hysteresis plot according to the direction of the magnetomotive force supplied by an exciting winding in deriving the part of the hysteresis loop within each quadrant. Thus, the quadrant of FIGURE 1 to the right of the B-axis and above the H-axis is called a "magnetizing quadrant" because the magnetomotive force applied while a hysteresis loop is being traced through that quadrant serves to impart remanent magnetism to the core. As indicated in FIGURES 1 and 2, the quadrant to the right of the B-axis and above the H-axis, and the quadrant to the left of the B-axis and below the H-axis, are both magnetizing quadrants.

As is well known, demagnetization of the core, i.e., removal of remanent magnetism therefrom, takes place during the tracing of the hysteresis loop in the other two quadrants of the hysteresis plot. Therefore, the other two quadrants are called "demagnetizing quadrants" herein.

Considering the hysteresis loops of FIGURES 1 and 2, it may be seen that the normal hysteresis loops 10 of FIGURE 1 have an upper magnetizing quadrant 12, a lower magnetizing quadrant 13, an upper demagnetizing quadrant 14, and a lower demagnetizing quadrant 15. The field-biased hysteresis loops 11 of FIGURE 2 have an upper magnetizing quadrant 20, a lower magnetizing quadrant 21, an upper demagnetizing quadrant 22, and a lower demagnetizing quadrant 23.

The additional convention is employed herein of designating that sector of a hysteresis loop within a given quadrant by the name of the quadrant. Thus, sector $jao$ of the extrinsically hypersquare hysteresis loop $akbla$ shown in FIGURE 1 is called a "magnetizing sector," or (more specifically) the "upper magnetizing sector," of that hysteresis loop. Similarly, sector $o'c'k'e'i'$ of the extrinsically hypersquare hysteresis loop $a'k'b'na'$ of FIGURE 2 is called the "upper demagnetizing sector" of that hysteresis loop.

Reverting to the expressions "extrinsic" and "intrinsic," it may now be seen that the normal form of an extrinsically hypersquare hysteresis loop is characterized by lobes, such as $k$ and $l$ in FIGURE 1, in its demagnetizing sectors. These lobes are, of course, not to be confused with the cusps of the same hysteresis loop, such as $a$ and $b$ of FIGURE 1, which are found in the magnetizing sectors thereof.

As may also be seen in FIGURE 1, the normal form of an intrinsically hypersquare hysteresis loop, such as $aocdeibpfghja$, does not exhibit pronounced lobes in its demagnetizing sectors.

Thus, an extrinsically hypersquare hysteresis loop is one which is lobed in the demagnetizing sectors of its normal form, while an intrinsically hypersquare hysteresis loop is one which does not exhibit easily recognizable lobes in its demagnetizing sectors. It follows that the normal form of an intrinsically hypersquare hysteresis loop roughly resembles the more usual type of hysteresis loop derived from, for example, one of the Permalloys which, in the conventional manner, has been thoroughly annealed after fabrication of the core. In most cases, however, the normal form of an intrinsically hypersquare hysteresis loop can be distinguished from the more conventional type of hysteresis loop by slight convexities at the H-axis, such as $i$ and $j$ in FIGURE 1.

In any event, whether it exhibits such slight convexities or not, an intrinsically hypersquare hysteresis loop can be recognized by reference to its field-biased forms. In its field-biased form, and as seen in FIGURE 2, an intrinsically hypersquare hysteresis loop exhibits a lobe in one of its demagnetizing sectors, such lobe resembling the lobes characteristic of extrinsically hypersquare hysteresis loops. For example, the normal form of an intrinsically hypersquare hysteresis loop as shown in FIGURE 1 is a smooth curve over its sector $cde$, while the corresponding sector $c'd'e'$ of the field-biased form (FIGURE 2) of the same hysteresis loop exhibits a lobe $m$ which resembles the lobes $k$ and $l$ manifested in the extrinsically hypersquare hysteresis loop $akbla$ of FIGURE 1. The more conventional types of hysteresis loops, such as those corresponding to, for example, a Supermalloy core which has been thoroughly annealed after fabrication, do not exhibit lobes in the demagnetizing sectors of their field-biased forms. Such hysteresis loops are called "hyposquare" herein.

In summary, a hypersquare hysteresis loop may be defined as one which in its field-biased forms exhibits a lobe in at least one of its demagnetizing sectors. A hysteresis loop is extrinsically hypersquare if its normal form exhibits lobes in its demagnetizing sectors, while a hysteresis loop is intrinsically hypersquare if its normal form is not characterized by lobes in its demagnetizing sectors.

It should be noted that while the extrinsically and intrinsically hypersquare hysteresis loops illustrated in FIGURES 1 and 2 are shown as coincident except in the regions where they are characteristically different, it is not necessarily true that the extrinsically and intrinsically hypersquare hysteresis loops of the same core material are so fully coincident, or coincident at all. That is, it must be recognized that the factors which tend to convert an intrinsically hypersquare loop core material into an extrinsically hypersquare loop core material, e.g., rigorous working of the core material, may tend to make its extrinsic hysteresis loop wider as compared with its intrinsic hysteresis loop. For this reason, it is pointed out that the considerable superposition of the extrinsic and intrinsic hysteresis loops of FIGURES 1 and 2 will not necessarily be found in any actual core material, but rather is adopted for the purpose of simple and clear illustration.

Magnetic core materials having hypersquare hysteresis loops, at least intrinsically, have been described in the literature. However, there is little, if anything, in the literature of magnetic core materials to indicate that attempts have been made to intentionally produce hypersquare loop materials, and particularly extrinsically hypersquare loop materials, or that the phenomenon of hypersquareness has been utilized in magnetic field sensitive devices such as magnetometers, vehicle presence detectors, compasses, direction finders, and the like. Thus, it is desirable to describe at this point a method of producing a core suitable for use in a field sensitive element according to the present invention. The core of this example is of toroidal configuration, but it is to be understood that certain other configurations may be employed.

By way of example, the first step in such a method may be the procurement of Hy Mu 80 wire having a diameter greater than the diameter of the wire to be used in the finished core. As is well known, Hy Mu 80 is a commercial product composed of approximately 17% iron, 79% nickel, 4% molybdenum, and certain other minor components. In one embodiment, for example, the diameter of the Hy Mu 80 starter material wire was approximately five times the diameter of the wire wound on the bobbin of the finished core. While the method described herein employs commercially available Hy Mu 80 wire as a starter material, it is believed that additional economies may be achieved in providing starter materials for carrying out the present invention by reducing the number of heat treating steps employed in producing commercial Hy Mu 80 wire.

Reverting to the method employing commercially available Hy Mu 80 wire as a starting material, this wire is next drawn down to the diameter of the wire to be wound upon the bobbin of the completed core. It is an important and characteristic feature of the present invention that the wire thus reduced is not subsequently annealed, or otherwise heat treated, but is merely stored for subsequent winding upon core bobbins, without any attempt being made to relieve internal stresses, close internal flaws, or the like.

Summarizing, a suitable magnetic core material for use in magnetic field sensitive elements according to the present invention may be made by procuring commercially available Hy Mu 80 wire the diameter of which is, say, five times the diameter of the wire to be wound on the core bobbin, and drawing this wire down to the latter diameter without annealing or other heat treating. Core wire so prepared will have an extrinsically hypersquare hysteresis loop resembling loop *akbla* of FIGURE 1, which figure was taken directly from an oscilloscope photograph of the hysteresis loop of a core wound with such wire.

In accordance with another characteristic aspect of the present invention, the core from which the extrinsically hypersquare hysteresis loop *akbla* of FIGURE 1 was derived was at no time annealed, or otherwise heat treated, either before or after winding the coils thereon.

The five to one reduction of wire diameter specified in the above-described method, and employed in producing the wire from which the extrinsically hypersquare hysteresis loop of FIGURE 1 was derived, is not an optimum or critical value of reduction. The amount of drawing, or otherwise working, of the starting material wire may be varied in order to vary the size of the lobes $k$ and $l$ (FIGURE 1). A lower limit to the amount of drawing, or otherwise working, which may be applied to the starting material wire will be that amount which produces intrinsically hypersquare loop wire which will manifest a lobe in one of its demagnetizing sectors immediately upon the application of a minimum value of ambient magnetic field. In producing hypersquare loop material for carrying out the present invention, it may be that all necessary working is provided during drawing of the starter material wire, by eliminating some heat-treating steps. It is to be understood that devices employing such material fall within the scope of the present invention.

Starting material wire formed from some other magnetic alloys of the classes generally known as ferrous, ferro-nickel, ferrites, or a combination thereof, may be similarly treated to produce a hypersquare hysteresis loop. Thus, the above example is not to be understood as limiting the present invention to Hy Mu 80 material in particular.

Given the reduced diameter magnetic wire prepared as described above, the core of a magnetic flux sensitive element according to the present invention may be fabricated by winding said prepared wire on a bobbin in the well known manner. The bobbin employed for this purpose may be of the ceramic type employed in the devices of the prior art, though a far less expensive nonrefractory bobbin may be used in carrying out the present invention since the present invention does not involve any annealing steps after the winding of the core.

In completing a magnetic field sensitive element constituting one form of the present invention:

(1) a first (inner) and then a second (outer) winding of ordinary insulated copper wire (winding No. 1 and winding No. 2, respectively, FIGURE 5) are wound over 180° of a core 33 made as described above, (2) a third (inner) and then a fourth (outer) winding of ordinary insulated copper wire (winding No. 3 and winding No. 4, respectively) are wound upon the other 180° of said core, (3) an end of winding No. 2 is connected to an adjacent end of winding No. 4 in bucking relation (i.e., outer windings No. 2 and No. 4 are differentially connected), and then (4) an end of inner winding No. 1 is connected in aiding relation to the adjacent end of inner winding No. 3 so that windings No. 1 and No. 3 effectively constitute a single winding extending completely around said core.

At the portion of said core diametrically opposite the above-mentioned connections there will then be found four leads, two connecting to the differentially connected outer coils No. 2 and No. 4, and two connected to the single coil (indicated at 31 in FIGURE 5) formed from inner windings No. 1 and No. 3. The differentially connected coils No. 2 and No. 4 will hereinafter be considered a single coil (indicated at 32 in FIGURE 5).

It is to be understood that the above-indicated differential and aiding relationships may be achieved by reverse winding, or reverse connecting, the coils. In the illustration, coils 2 and 4 are oppositely wound relative to each other, whereas coils 1 and 3 are each wound in the same direction.

The resulting magnetic field sensitive element constituting one embodiment of the present invention may be wrapped in a protective layer of muslin, potted, mounted in a protective case, etc., if desired.

FIGURES 3 and 4 illustrate the structural differences between a core typical of the prior art devices and the core of the embodiment of the present invention described hereinabove, these differences accounting in part for the cost advantage of devices according to the present invention over those of the prior art. As seen in FIGURE 3, the typical core of the prior art comprises a bobbin 25 composed of ceramic or other refractory material upon which is wound a number of turns of magnetic ribbon 26. The refractory construction of bobbin 25 of the prior-art device of FIGURE 3 is necessitated by the fact that the cores of the devices of the prior art are annealed, or otherwise heat treated, after winding.

By contrast, the core 33 of an embodiment of the present invention (FIGURE 4) comprises a bobbin 27, which need not be composed of refractory material and can therefore be very inexpensive, upon which is wound about 50 turns of hypersquare hysteresis loop wire 28 prepared by the method described above. Three advantages of this core, as compared with cores of typical devices of the prior art, are: (1) The use of a less expensive, nonrefractory bobbin, (2) the use of magnetic material in the form of wire, rather than ribbon, which ribbon is more expensive to produce and more difficult to wind accurately, and (3) the elimination of the post-annealing step and its accompanying safety measures, soaking time, and cleaning steps.

A circuit in which a magnetic field sensitive element according to the present invention may be employed is shown in FIGURE 5. This circuit comprises a magnetic field sensitive element 30, made as described hereinabove, which has a winding 31 the two halves of which are connected in aiding relation to effectively form a single coil, a winding 32 consisting of two differentially connected halves, a core 33 fabricated from extrinsically hypersquare loop material upon which windings 31 and 32 are wound, and a pair of conventional separators 34 and 34' which do not constitute part of the present invention.

The circuit of FIGURE 5 further comprises a source 35 of power line frequency exciting current, e.g., a suitably designed transformer; a direct current source 36 of nulling current, e.g., a 6-volt battery; an output relay 37, e.g., a small, transistorized power amplifier supplying a simple relay, or a sensitive relay of the type sometimes called a "Weston sensitive relay"; an oscilloscope 38 equipped for voltage measurements, or the like; and a triple-pole double-throw switch 39 comprising blades 39a, 39b, and 39c which are mechanically ganged for simultaneous operation by the actuation of a single mechanical control means. A 10,000-ohm voltage dividing potentiometer 42 is connected across the terminals of the nulling current supply 36, and a 10,000-ohm nulling current limiting resistor 43 is connected between the slider 44 of potentiometer 42 and the blade 39a of switch 39. Of course, the above-indicated circuit values are not to be interpreted as limiting in nature.

The circuit of FIGURE 5 will operate in either of two modes, depending upon the setting of switch 39. When switch 39 is set as shown in FIGURE 5, the circuit operates in its "magnetometer mode," and may be used to measure the intensity of magnetic fields in which field sensitive element 30 is immersed. When switch 39 is set in its position opposite to that shown in FIGURE 5 the circuit operates in its "presence detector mode," and may be used to detect the presence of automobiles upon roads, aircraft taxiing upon runways, and the like.

In either mode of operation, exciting current source 35 is connected across exciting winding 31, the two halves of which are connected in aiding relation to effectively form a single coil extending substantially completely around the core 33.

In the magnetometer mode of operation, the vertical input terminals of oscilloscope 38 are connected across the terminals of differentially connected detector winding 32, and nulling current supply 36 and output relay 37 are disconnected from the circuit. Also, the horizontal sweep of oscilloscope 38 is synchronized with the line frequency, i.e., with exciting current supply 35. Thus, oscilloscope 38 will display a base line 46 from which a plurality of equal spikes 47 extend downwardly when field sensitive element 30 senses an ambient magnetic field. In practice, base line 46 will not necessarily be flat, but may manifest undesired signals, and may also be "noisy." As explained hereinafter, these spikes 47 result from the dissymmetry of the field-biased form of the hypersquare hysteresis loop of core 33. It has been discovered in making the present invention that the length of spikes 47 is a function of the intensity of the ambient magnetic field along the sensing axis of field sensitive element 30, i.e., along a line connecting separators 34 and 34′, over a considerable range and to a useful degree of accuracy.

Thus, when the circuit of FIGURE 5 is switched to its magnetometer mode by means of switch 39, the intensity of the magnetic field along the sensing axis of the field sensitive element 30 may be determined by (1) reading the length, i.e., the voltage, of spikes 47 on a grid superposed upon the oscilloscope 38 display, (2) adjusting the voltage amplitude control of an oscilloscope calibration generator until its output displayed upon oscilloscope 38 in the form of a spike is equal in length to the spikes 47, and then reading the voltage calibrations of the control. The voltage so determined may then be multiplied by an easily-derived constant in order to obtain the field intensity.

When the circuit of FIGURE 5 is operating in the presence detector mode, oscilloscope 38 is disconnected from the circuit, output relay 37 is connected across the terminals of detector winding 32, and nulling current supply 36 is connected across the terminals of detector winding 32 via potentiometer 42 and nulling current limiting resistor 43.

Figure 7:
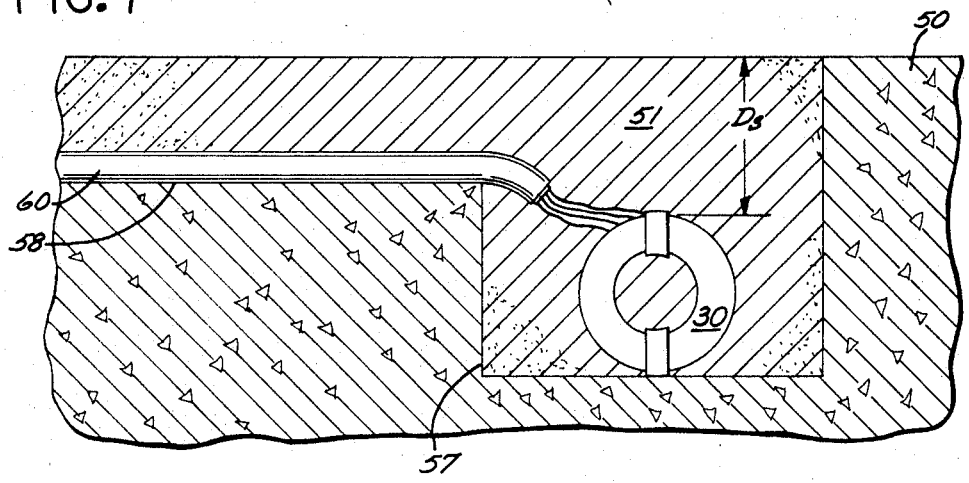
FIGURE 7 is a view taken along line 7—7 of FIGURE 6.

It is typical of presence detector applications of the device of the invention that the field sensitive element 30 is located remote from the exciting and output relay portions of the presence detector circuit, in an optimum position for sensing the presence of automobiles, trucks, busses, aircraft, or any magnetic mass. Thus, as shown in FIGURE 6, field sensitive element 30 may, for example, be disposed within the body of a roadway 50 by being cemented into a trench 51 cut in the roadway. As best seen in FIGURE 7, trench 51 may have a slightly deepened pocket 57 directly below the center of a vehicle lane, and a shallower portion 58 extending from pocket 57 to the side of the roadway adjacent the cabinet or other means housing the exciting current source, nulling current source, and output relay.

Field sensitive element 30 may be disposed in pocket 57 with its sensing axis vertical. Cable 60 containing the leads of windings 31 and 32 may be disposed through the shallow part 58 of trench 51. Trench 51 may be filled with cementitious material 61, thus restoring the smooth surface of roadway 50, protecting field sensitive element 30 and cable 60, and supporting field sensitive element 30 in its vertical orientation.

In practical applications of magnetic vehicle presence detectors, their sensing elements should be located at least a distance $D_s$ (FIGURE 7) below the surface of the roadway to thus prevent the generation of spurious signals in their detector windings by the permanent magnetic fields of the magnetically hard parts of the vehicles passing thereover, and by the stray fields of such vehicles' generators and other electrical equipment. This distance $D_s$ is found to be approximately eighteen inches, and thus the sensing device buried in the roadway should be capable of sensing vehicles at this distance. The magnetic field sensitive elements of the present invention, though inexpensive as compared with the sensing elements of the prior art, are fully capable of unambiguously detecting vehicles at this and greater distances.

Having considered the manner of locating the vehicle sensing means in the roadway, and the orientation thereof, the effect of a passing vehicle may now be seen in connection with FIGURE 6. When a vehicle, such as 65 of FIGURE 6, passes over the field sensitive element 30 located within the roadway, the steel body of the vehicle provides a relatively low reluctance path for the flux lines 66 of the earth's magnetic field, thereby concentrating flux lines 66 as illustrated. The ambient magnetic field of field sensitive element 30 is thus increased in intensity. Thus, when a vehicle passes, the component of the ambient magnetic field directed along the sensing axis of field sensitive element 30 is increased as compared with its value when no vehicle is present.

At the time of installation of the present detector, however, potentiometer 42 (FIGURE 5) is adjusted to pass such a value of nulling current through differentially connected winding 32 of field sensitive element 30 as will induce in the two halves of core 33 magnetomotive forces $H_b$ (FIGURE 8) equal and opposite to the magnetomotive forces $H_e$ (FIGURE 8) resulting from the component of the earth's magnetic field directed along the sensing axis of the field sensitive element when no vehicle is present. That is to say, potentiometer 42 is so adjusted at the time of installation that there is no net biasing field within core 33 when no vehicle is present. As explained above, when there is no net biasing field within core 33 the hysteresis loop of the core assumes its normal form, FIGURE 1. Due to the symmetry of the normal form of the hysteresis loop, FIGURE 1, insufficient voltage is generated across the terminals of detector winding 32 to operate output relay 37. Thus, there will be no signal at the output terminals 70 and 71 of output relay 37 when no vehicle is passing over, or standing at, the field sensitive element 30 buried in roadway 50.

It should be noted here that one of the advantages of the device of this invention over some of the devices of the prior art lies in that the device of the invention indicates the presence of vehicles standing over the field sensitive element, as well as vehicles passing over the field sensitive element, which is not the case with some devices of the prior art.

Figure 8:
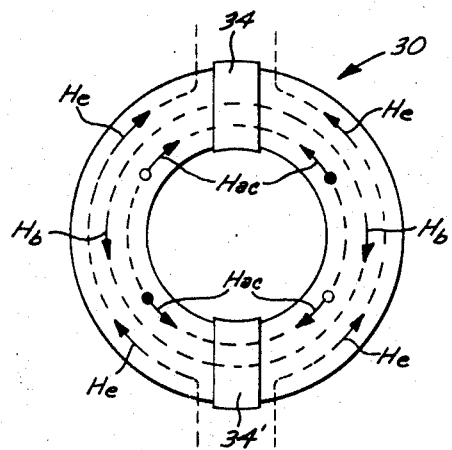
FIGURE 8 illustrates the component magnetomotive forces within the magnetic field sensitive element involved in the operation of the circuit of FIGURE 5 as a presence detector.

The operation of the device of the invention in the presence of a magnetic object, e.g., a vehicle, adjacent the field sensitive element 30 may now be understood by reference to FIGURE 8, and comparison thereof with the physical structure of field sensitive element 30 as shown schematically in FIGURE 5 using separators 34, 34′ as a reference. Before doing so, however, it is pointed out that many of the principles of operation characterizing the devices of the prior art inhere in the operation of devices according to the present invention. Therefore, the description of the operation of the invention in the presence of a vehicle or other magnetic object given herein will be largely limited to those aspects of operation wherein the invention is distinguished from the devices of the prior art. The operation of the devices of the prior art are explained in the literature, e.g., Magnetic Amplifier Circuits, W. A. Geyger, McGraw-Hill Book Co., Inc., New York, N.Y., second edition, 1957, pages 271–78; and The Ring-Core Magnetometer—A New Type of Second-Harmonic Flux-Gate Magnetometer, William A. Geyger, A.I.E.E. Transactions, vol. 81, Part 1, March 1962, pages 65–73.

The prior-art devices such as those of Geyger generally comprise a magnetic core carrying at least an exciting winding analogous to winding 31 herein and a pair of differentially connected detector winding sections analogous to winding 32 herein. These devices depend for their operation, as does the present invention, upon the dissymmetry of their hysteresis loops when unbalancing magnetic fields are produced within the cores of their field sensing elements by ambient magnetic fields. As may be seen in many textbook drawings, charts supplied by the manufacturers of magnetic materials, etc., the effect of such an unbalancing field in the conventional core materials of the prior art, e.g., Supermalloy, is to cause one of the cusps in the magnetizing sectors of the hysteresis loop to become a lobe, i.e., to become rounded rather than pointed. Increase of the unbalancing field in these materials causes the lobe to decrease in size as compared with the cusp remaining at the other end of the hysteresis loop.

Since the detector windings of these prior-art devices are oppositely wound, the flux produced by the alternating magnetomotive force of their exciting windings links the detector windings in opposite directions. Thus, the total flux linking one detector winding is represented by a first point tracing the hysteresis loop of its core in a counterclockwise direction, while the total flux linking the other detector winding is represented by a second point tracing the hysteresis loop at all times the same distance from the B-axis as said first point and on the opposite side of the H-axis from said first point. In FIGURES 1 and 2, points $q$ and $q''$ are typical of said first point, and points $q'$ and $q'''$ are typical of said second point (but with reference, of course, to the present hysteresis loops and not the prior art).

Thus, when there is no unbalancing field, and the hysteresis loop is symmetrical, the total fluxes linking the two sections of the detector winding will at all times be equal in magnitude, or substantially so within practical limits of the construction. Therefore, due to the fact that these sections of the detector winding are differentially connected, the net voltage at the detector winding terminals will remain substantially zero. When the presence of an unbalancing field causes the hysteresis loop to become dissymmetrical, however, the wave form of the flux linking one section of the detector winding differs from that of the flux linking the other section of the detector winding. Thus, the voltages induced in the two sections of the detector winding, which are proportional to the derivatives of their corresponding flux waveforms, differ from each other, and the net voltage appearing at the output terminals of the detector winding is no longer zero during the entire cycle of the exciting voltage. Thus, dissymmetry of the hysteresis loop due to an unbalancing flux in the core causes an output voltage at the terminals of the detector winding. The magnitude of the energy manifested by this voltage is a function of the degree of dissymmetry of the hysteresis loop.

Since, as shown for example in FIGURE 5, devices according to the present invention also comprise a magnetic core; an undirectionally wound, alternating current excited exciter winding; and a two-section, oppositely wound, differentially-connected detector winding, the devices according to the invention also produce signal voltages at the output terminals of their detector windings when unbalanced bias fields are present in their cores.

As explained above, the cores of the devices of the prior art such as those of Geyger have hysteresis loops in which, upon the application of unbalancing flux, the principal effect is that the magnetizing sectors become dissymmetrical. Therefore, these devices of the prior art are designated "magnetizing quadrant dissymmetry devices" herein. In devices according to the invention, however, i.e., devices employing hypersquare loop cores, the principal (or, at least, a major) dissymmetry relied upon for the production of signal voltages at the terminals of the detector winding is the dissymmetry between the demagnetizing sectors of the hysteresis loop.

As may be seen by comparison of sectors 20 and 21 of the hysteresis loops shown in FIGURE 2, unbalancing flux also produces a dissymmetry between the magnetizing sectors of the hysteresis loop in hypersquare loop core material. However, a major (and, perhaps, the major) effect in hypersquare loop devices prepared according to the present invention is the dissymmetry between the demagnetizing quadrants. Such dissymmetry between the demagnetizing quadrants is a feature believed to be unique to the devices of the present invention. Therefore, the devices of the present invention are called "demagnetizing quadrant dissymmetry devices."

One of the principal advantages of the present invention lies in this distinction between magnetizing quadrant dissymmetry and demagnetizing quadrant dissymmetry. As discovered in making this invention, the phenomenon of demagnetizing quadrant dissymmetry is, in a practical sense, much more sensitive to unbalancing fields than is the phenomenon of magnetizing quadrant dissymmetry. That is, a magnetizing quadrant dissymmetry device must have a core of as high permeability as can be provided in order to have sensitivity of the order of the sensitivity of the device of the invention. Providing this high permeability, however, requires that the core be formed from more expensive starting materials, that the core be wound upon a relatively expensive refractory bobbin, and that the core be annealed after winding upon the bobbin.

An additional feature of the present invention when used as a presence detector is the employment of a nulling current, without an additional winding, to produce zero net unbalancing field in the core in the absence of the object to be detected, as described above in connection with the presence detector mode of operation of the circuit of FIGURE 5. This feature results in maximum sensitivity of the device when used as a presence detector, and permits the use of a very simple device, e.g., a Weston sensitive relay, as the output relay. The signal produced by the detector winding of the device according to the invention is sufficient to actuate such a sensitive delay and, as is well known, the output terminals of such a relay, 70 and 71 in FIGURE 5, are capable of controlling considerable power, sufficient to operate the circuits of standard traffic signal systems, tape punches, electromagnetic counters, and the like.

It is also a feature of the present invention that the field sensitive detectors of the invention have sensitivity of the order of that of the prior-art devices when the frequency of the exciting voltage is as low as ordinary power line frequencies, e.g., 60 cycles per second. This advantage of the present invention makes it possible to provide a very inexpensive detector circuit wherein the source of exciting voltage is a small, inexpensive transformer, in those many applications where alternating current power lines are used to power the detector circuit and associated apparatus.

Another feature of the present invention lies in the fact that inexpensive wire-wound core construction may be used, and that such construction not only imparts the economic advantage of inexpensive construction but also contributes to the sensitivity of the device in at least two ways. Firstly, a wire-wound core having the same cross-sectional area of core material as a ribbon-wound core may consist of many more turns of wire than the corresponding number of turns of ribbon. Thus, the probability is far greater in a wire-wound core that local imperfections in the core material, i.e., the wire, will be averaged out because of the relatively large number of individual turns. It follows that a wire-wound core will probably have greater magnetic symmetry between its two halves coacting with the two sections of the detector winding, as compared with an equivalent tape-wound core, and thus have a more symmetrical normal hysteresis loop, resulting in a better voltage null in the absence of unbalancing bias field. Yet, as is well known, wire is much cheaper to draw than ribbon is to roll, and wire is much easier to wind, especially when random wound, than is ribbon.

Secondly, the wire-wound construction of the cores according to the invention possess the advantage over the conventional ribbon-wound cores of much greater radial reluctance. As may be seen by comparing FIGURE 3 with FIGURE 4, there is little air gap between the tightly wound adjacent turns of a ribbon core (FIGURE 3), while there is effectively a considerable air gap between adjacent turns of a wire winding. That is, the adjacent turns of a ribbon winding are pressed tightly against each other over their entire surfaces, while the adjacent turns of a wire winding contact only along a line. Thus, the radial reluctance of the present core is much less than that of a ribbon-wound core.

The practical value of this high radial reluctance can be seen when it is considered that, on the one hand, effectiveness of the core in a field-sensitive element requires that the flux linking the core be substantially uniformly distributed through the magnetic material thereof, and thus as equally as possible affects all of the domains in the magnetic material, while, on the other hand, it is well known that the flux in a closed magnetic circuit tends to exist largely at the inner, i.e., smallest path length, surface of the magnetic circuit. Thus, the desirability of the high radial reluctance of the wire-wound cores of the invention results from the tendency of this high radial reluctance to resist this flux line bunching effect at the shortest, or inner, path within the core, and thus to produce a more efficient core because of the relatively uniform distribution of flux therethrough.

It is another, and by no means minor, feature of the invention that the cores according to the invention have a high ratio of inside diameter to outside diameter (ID–OD ratio, FIGURE 5). As pointed out by Geyger, the effective permeability of a ring-core flux-gate element is a function of ID–OD ratio and mean diameter of the core, as well as of the permeability of the magnetic material itself. This fact has long been employed in ribbon cores of the kind comprising core materials with high intrinsic permeability which are post-annealed to increase their permeability still further. Thus, it is not surprising that high ID–OD ratios were employed in ring-core flux-gate magnetometers using such cores.

On the other hand, the present invention teaches the utilization of high ID–OD ratios when relatively low-grade, unannealed and, at least in some cases, wire-wound core materials are used. Thus, this feature of the present invention which consists in utilizing high ID–OD ratio in cores comprising relatively inexpensive hypersquare loop core materials is not taught in the prior art.

In conclusion, it is emphasized that the magnetic field sensitive element 30, constructed as described in detail above, produces a hysteresis loop of the type defined hereinabove as "extrinsically hypersquare." This is the preferred construction, and results not only from the use of the stated core material but also from factors such as the above-indicated high ID–OD ratio. Extrinsically hypersquare loops (e.g., loop *akbla*, FIGURE 1) are preferred because the degree of distortion in the field-biased form (FIGURE 2) is greater, hence the sensitivity is increased. It is to be understood, however, that the present invention in its broader aspects is generic to both extrinsically and intrinsically hypersquare loops.

I claim:
1. Magnetic field sensing means, comprising:
    wire-wound magnetic core means having a hypersquare hysteresis loop, and
    winding means disposed upon said core means.
2. Magnetic field sensing means as claimed in claim 1, in which said core means forms a closed magnetic circuit.
3. Magnetic field sensing means as claimed in claim 2, in which the only alternating voltage supplied to said winding means is of power line frequency.
4. Magnetic field sensing means as claimed in claim 1, in which the only alternating voltage supplied to said winding means is of power line frequency.
5. Magnetic field sensing means, comprising:
    magnetic core means, and
    winding means disposed thereupon,
    said core means being characterized by a hysteresis loop which exhibits at least one lobe in at least one of its demagnetizing sectors when said core is biased by a field of the minimum strength which said sensing means is capable of sensing.
6. Magnetic field sensing means as claimed in claim 5, in which the only alternating voltage supplied to said winding means is of power line frequency.
7. Apertures for sensing and indicating the presence of a magnetic field, which comprises:
    a generally toroidal core,
        said core being formed of a substantial number of coils of wire,
            said coils being coaxial with the axis of said core and being in line contact with each other, said wire being formed of magnetizable material which has not been annealed subsequent to drawing of the wire,
        said core being characterized by a hypersquare hysteresis loop,
    an exciting winding wound on said core throughout at least a major portion of the circumference thereof,
    a source of A.C. exciting current connected to said exciting winding to energize the same,
    first and second detector windings wound, respectively, on opposite halves of said core,
        said detector windings being so wound and connected as to be in bucking or differential relationship relative to each other, and
    output means connected to said detector windings.
8. The invention as claimed in claim 7, in which said source of A.C. exciting current has a frequency of 60 cycles per second.
9. The invention as claimed in claim 7, in which said magnetizable material is an alloy composed of a major part of nickel, and a minor part of iron.
10. The invention as claimed in claim 7, in which said magnetizable material is an alloy consisting essentially of about 17% iron, about 79% nickel, and about 4% molybdenum.
11. The invention as claimed in claim 7, in which said magnetizable material is an alloy falling in at least one of the following classes: ferrous, ferro-nickel, ferrite, and combinations thereof.

References Cited

UNITED STATES PATENTS

| | | | |
|---|---|---|---|
| 2,885,646 | 5/1959 | Bugg | 336—234 X |
| 3,201,732 | 8/1965 | Olsen et al. | 336—213 |
| 3,233,171 | 2/1966 | Yamaguchi et al. | 324—47 |

(Other references on following page)

OTHER REFERENCES

C. Q. Adams, "A Simple Field Detector for a DC Permeameter," The Rev. of Sci. Instr., October 1960, pp. 1119 and 1120.

W. A. Geyger, "Magnetic Amplifier Circuits" (McGraw-Hill, N.Y., 1957), 2nd. ed., p. 364.

RUDOLPH V. ROLINEC, *Primary Examiner.*

A. E. SMITH, *Assistant Examiner.*

U.S. Cl. X.R.

340—38; 336—213, 234; 324—41